United States Patent
Viala et al.

(10) Patent No.: US 10,444,762 B2
(45) Date of Patent: Oct. 15, 2019

(54) PROGRESSIVE IMAGING SYSTEM FOR ENHANCED MACHINE VISION

(71) Applicant: Bayerische Motoren Werke Aktiengesellschaft, Munich (DE)

(72) Inventors: Pascal Viala, Mountain View, CA (US); Mehmet Inonu, Mountain View, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 165 days.

(21) Appl. No.: 15/641,127

(22) Filed: Jul. 3, 2017

(65) Prior Publication Data

US 2019/0004531 A1   Jan. 3, 2019

(51) Int. Cl.
| | | |
|---|---|---|
| *G02B 3/10* | (2006.01) | |
| *G05D 1/02* | (2006.01) | |
| *G06K 9/00* | (2006.01) | |
| *H04N 1/00* | (2006.01) | |
| *H04N 5/232* | (2006.01) | |
| *H04N 7/18* | (2006.01) | |

(52) U.S. Cl.
CPC .......... *G05D 1/0246* (2013.01); *G02B 3/10* (2013.01); *G06K 9/00805* (2013.01); *H04N 1/00* (2013.01); *H04N 5/23212* (2013.01); *H04N 7/18* (2013.01); *H04N 7/181* (2013.01)

(58) Field of Classification Search
None
See application file for complete search history.

(56) References Cited

U.S. PATENT DOCUMENTS

| | | | | |
|---|---|---|---|---|
| 7,116,364 | B2 * | 10/2006 | Battles | H04N 5/23212 348/240.1 |
| 2011/0194068 | A1 * | 8/2011 | Blum | G02C 7/061 351/159.42 |
| 2011/0216197 | A1 * | 9/2011 | Mulin | G02B 13/001 348/148 |
| 2014/0267825 | A1 * | 9/2014 | Ono | G02B 23/2461 348/222.1 |
| 2015/0156478 | A1 * | 6/2015 | Ono | H04N 5/2251 348/49 |
| 2016/0185219 | A1 * | 6/2016 | Sakata | G08G 1/16 701/36 |
| 2018/0326909 | A1 * | 11/2018 | Iwashita | G02B 13/18 |

OTHER PUBLICATIONS

Gregor et al., "EMS-Vision: A Perceptual System for Autonomous Vehicles," IEEE Transactions on Intelligent Transportation Systems, vol. 3, No. 1, Mar. 2002 (Year: 2002).*
Reinhold Behringer, "Road Recognition from Multifocal Vision," Proc. of Int. Symp. on Intelligent Vehicles, Oct. 1994 (Year: 1994).*
ED Dickmanns, "Dynamic Vision-Based Intelligence," AI Magazine vol. 25, No. 2, 2004 (Year: 2004).*

* cited by examiner

Primary Examiner — Soo Shin
(74) Attorney, Agent, or Firm — Crowell & Moring LLP

(57) ABSTRACT

A vehicle control device has a control unit configured to adapt a plurality of vehicle systems in response to captured images of an environment external to the vehicle, a camera configured to capture images of the environment and communicate the captured images to the control unit, and a progressive lens coupled to the camera so as to focus the captured image over a continuous focus area.

15 Claims, 4 Drawing Sheets

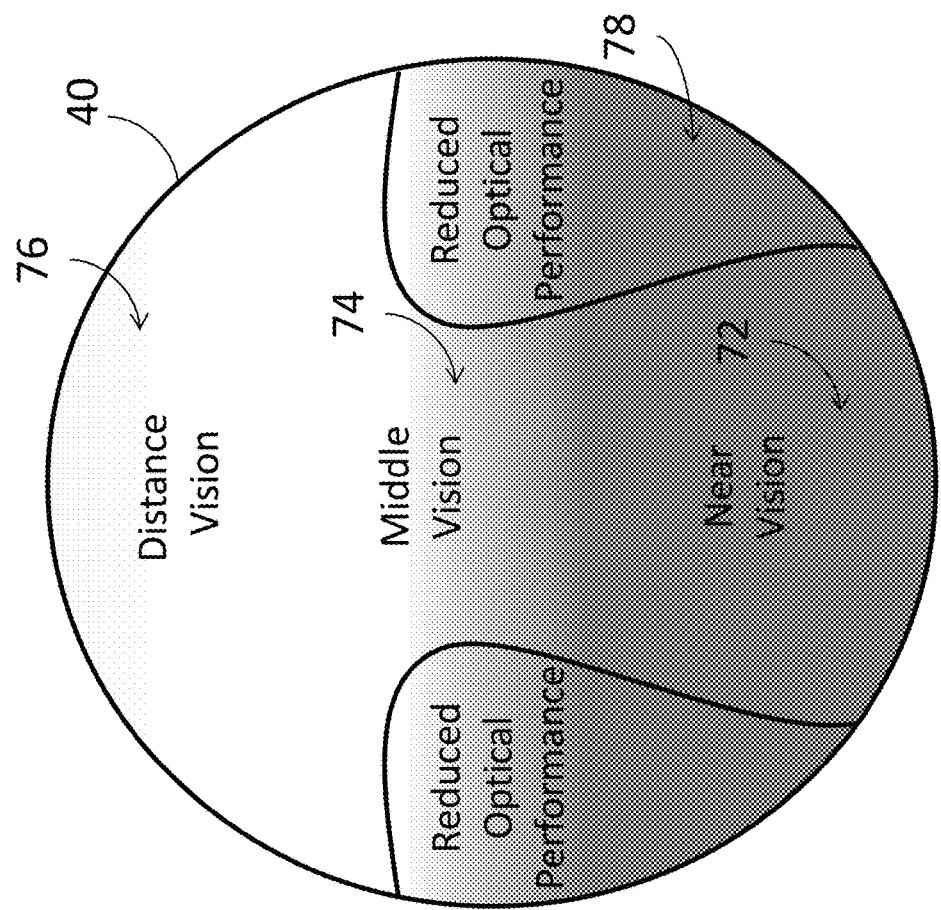

PROGRESSIVE IMAGING SYSTEM FOR ENHANCED MACHINE VISION

FIELD OF THE INVENTION

The disclosed invention relates to vehicle systems utilizing machine vision, and more particularly to progressive imaging systems for such systems.

BACKGROUND OF THE INVENTION

Advanced driver assistance systems (ADAS) automate, enhance or otherwise adapt other systems of the ADAS equipped vehicle. For example, some ADAS features are designed to avoid collisions and other accidents by alerting the driver to the potential for a collision or accident occurring, by taking over driving action when such potential for a collision or accident is determined, or by implementing other safeguards. Other ADAS features include systems that automate lighting, provide adaptive cruise control, automate braking, incorporate GPS/traffic warnings, connect to smart phones or other devices, alert the driver to dangers, keep the driver in the correct lane, or make the driver aware of objects present in blind spots.

Highly Automated Driving (HAD) systems are ADAS systems that automate vehicle driving on highways and the like. HAD systems generally require that the driver take over driving responsibility, and thus initiate manual driving, under certain circumstances. However, HAD systems are able to maintain autonomous driving under most circumstances likely to be encountered on highways and the like. HAD systems are classified as Level 3 automated driving systems by the National Highway Traffic Safety Administration.

Fully Automated Driving (FAD) systems are ADAS systems that fully automate vehicle driving. The driver is not required to monitor traffic, or otherwise take over the driving responsibility, and can be occupied with another task. FAD systems are classified as Level 4 or 5 automated driving systems by the National Highway Traffic Safety Administration.

Each of these systems typically utilize cameras to capture images of the environment surrounding the vehicle, which images are then processed by the system to determine the environmental conditions relevant to that system. Each such camera typically includes a lens with a fixed focal length (i.e., the distance at which the lens is focused) that is appropriate for the environmental condition that is relevant to the particular ADAS/HAD/FAD system.

A problem with such a configuration is that a camera with a near-focus lens is typically only used for near-range imaging, e.g., lane detection, because objects located in the mid-range and far-range distances appear out-of-focus to the image sensor, and are therefore more difficult to resolve. Cameras respectively equipped with mid-focus or far-focus lenses are likewise typically only used in connection with those ranges. This results in reduced system performance.

A multi-camera solution has been proposed in which the ADAS/HAD/FAD system is provided with three cameras, each of which is equipped with a different one of near-focus, mid-focus and far-focus lenses. While the multi-camera solution provides better performance over the target range, it still only provides in-focus images in the three defined focus sweet spots. Moreover, such systems are more complex, have higher failure rates, consume more energy, are larger, and are more costly. Thus, there is a clear trade-off between each of these factors and system performance.

SUMMARY OF THE INVENTION

The present invention provides for a vehicle control device that makes use of a progressive lens to overcome the problems noted above. The vehicle control device includes a control unit configured to adapt a plurality of vehicle systems in response to captured images of an environment external to the vehicle. The vehicle control device also includes a camera configured to capture images of the environment and communicate the captured images to the control unit. The vehicle control device still further includes a progressive lens coupled to the camera so as to focus the captured image over a progressive focus area.

Other features and advantages of the present invention will become apparent from the following more detailed description, taken in conjunction with the accompanying drawings, which illustrate, by way of example, the principles of the presently described invention.

BRIEF DESCRIPTION OF THE SEVERAL VIEWS OF THE DRAWING(S)

FIG. 1 schematically illustrates a vehicle control device according to at least one embodiment of the present invention.

FIG. 3 illustrates an exemplary progressive lens according to at least one embodiment of the present invention.

Figure 4B:
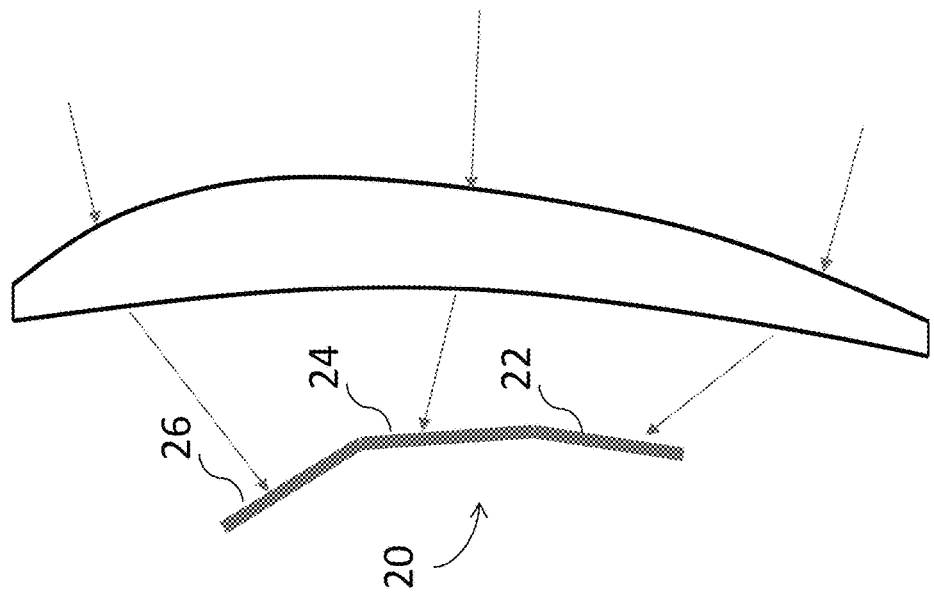
Figure 4A:
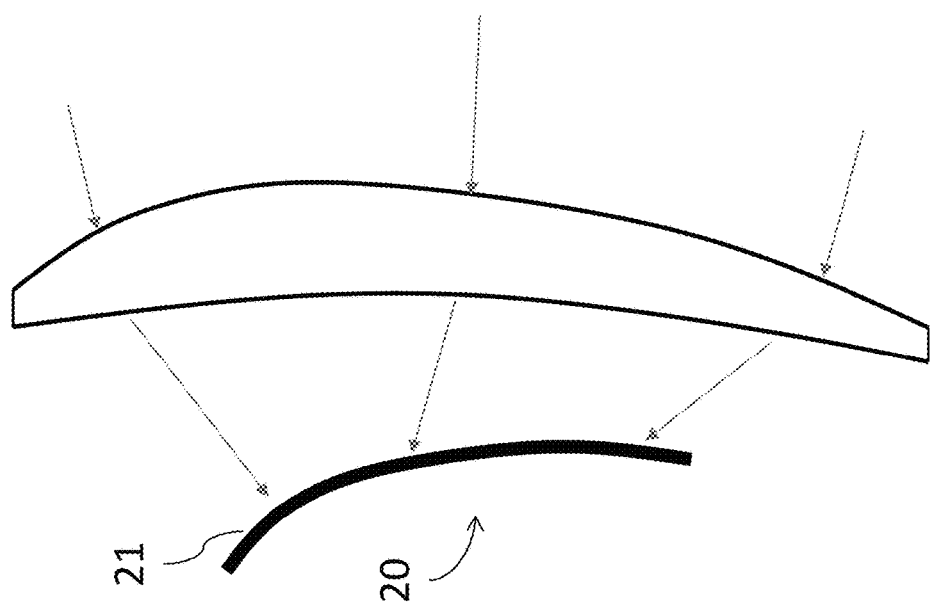

FIGS. 4a-b illustrate exemplary progressive lens and sensors according to at least one embodiment of the present invention.

DETAILED DESCRIPTION OF THE PREFERRED EMBODIMENTS

The above described drawing figures illustrate the described invention in at least one of its preferred, best mode embodiment, which is further defined in detail in the following description. Those having ordinary skill in the art may be able to make alterations and modifications to what is described herein without departing from its spirit and scope. While the disclosed invention is susceptible of embodiment in many different forms, there is shown in the drawings and will herein be described in detail at least one preferred embodiment of the invention with the understanding that the present disclosure is to be considered as an exemplification of the principles of the invention and is not intended to limit the broad aspect of the invention to the embodiment illustrated. Therefore, it should be understood that what is illustrated is set forth only for the purposes of example and should not be taken as a limitation on the scope of the present invention.

Figure 1:
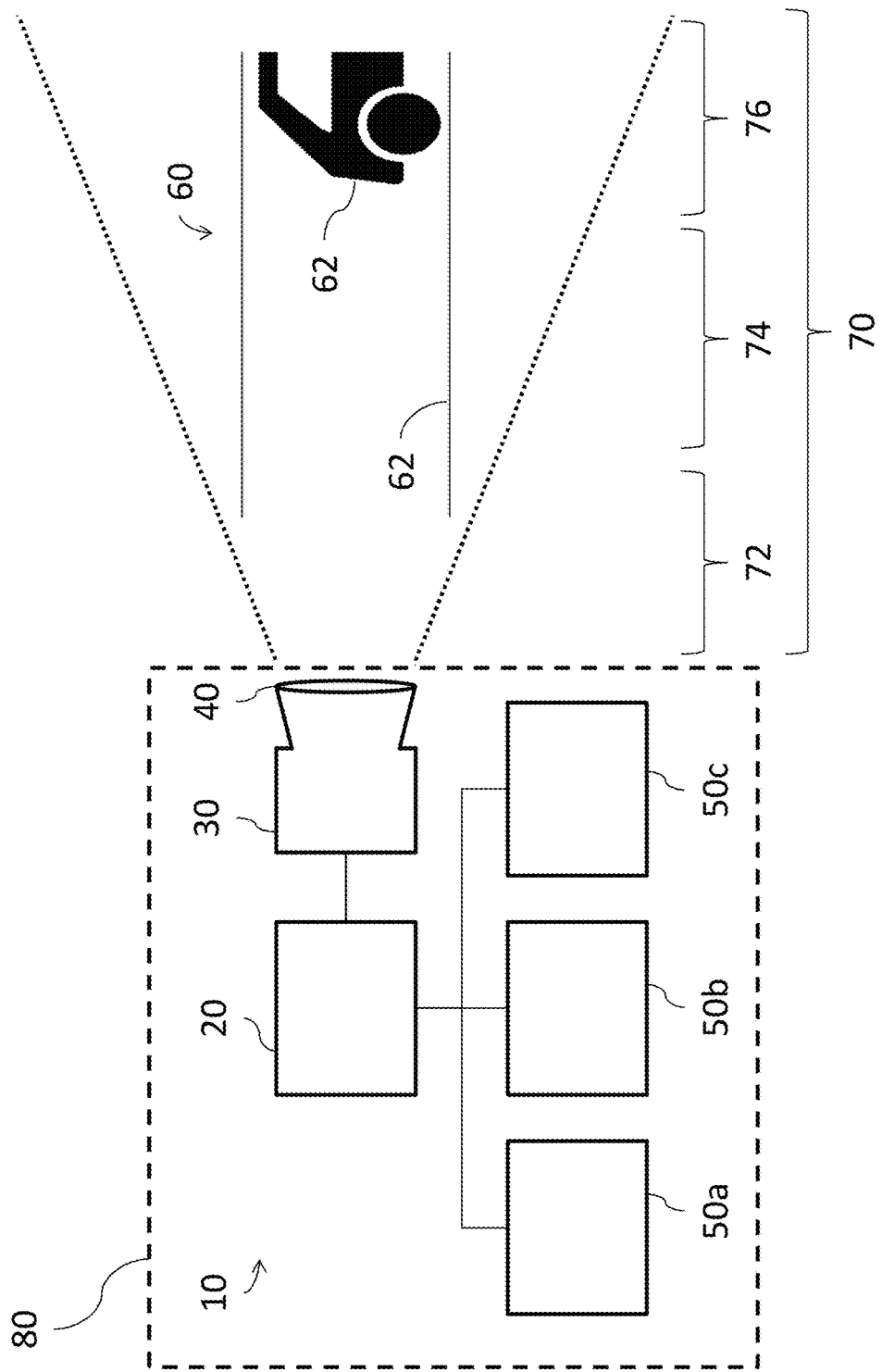

FIG. 1 schematically illustrates a vehicle control device 10 according to at least one embodiment of the present invention. The vehicle control device comprises: a control unit 20 communicatively coupled to a camera 30 having an associated progressive lens 40.

The camera is configured to capture images of objects 62 (e.g., road lanes, other vehicles, etc.) within an environment 60 external to the vehicle 80, and to communicate the captured images to the control unit as image data.

The control unit is configured to receive the image data from the camera, and to adapt or otherwise control a plurality of vehicle systems 50a-c in response to the received image data. In some embodiments, the control unit identifies and determines the presence of the objects based on the received image data, and controls at least one vehicle system based on the identification of the object and/or the determination of whether the object is present. The control unit may accordingly include appropriately configured hardware, software and/or firmware.

The vehicle systems are those vehicle systems typically adapted or controlled by ADAS features. Accordingly, the vehicle systems include but are not limited to: steering systems, braking systems, acceleration systems, navigation systems, lighting systems and the like.

The structures and operations of applicable control units and vehicle systems are understood to those of ordinary skill in the art, and for the sake of brevity are not presented in detail here. Such control units and vehicle systems include those currently used to enable ADAS features.

Figure 2:
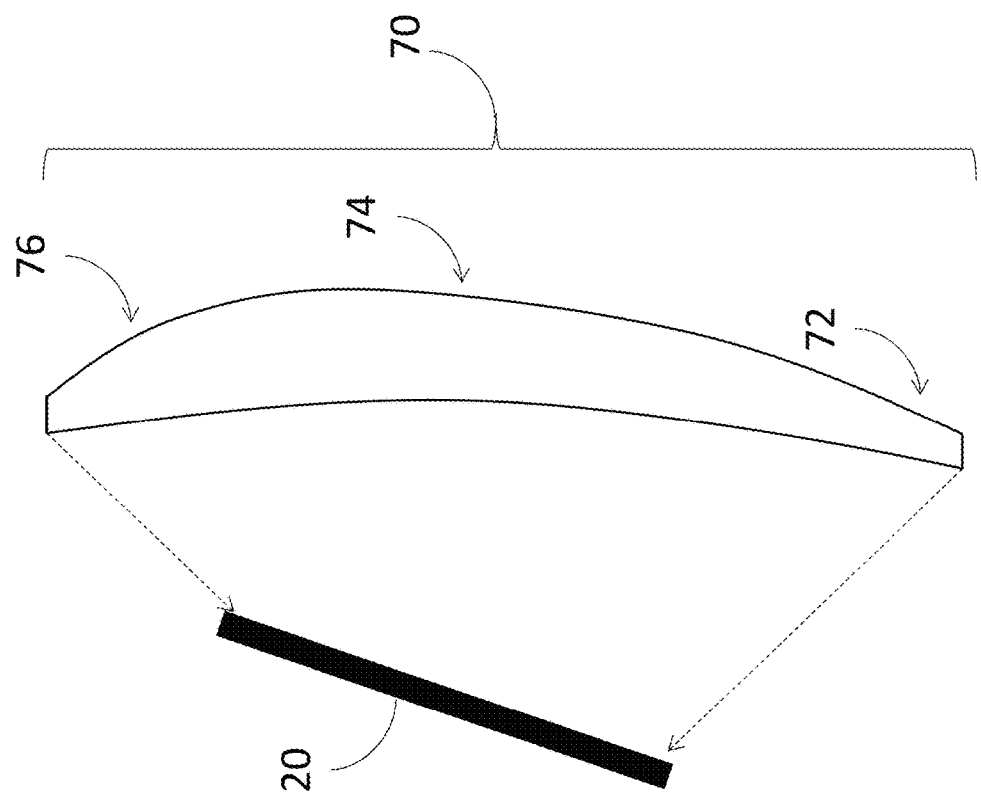
FIG. 2 illustrates an exemplary progressive lens according to at least one embodiment of the present invention.

As shown in FIG. 2, the camera preferably comprises an image sensor 32 operatively coupled to a single progressive lens 40. Preferably, the image sensor is a single unitary image sensor.

The progressive lens is preferably of a shape that provides focused images across a progressive focus area 70 such that images of objects within the progressive focus area are captured by the camera in-focus. The progressive focus area may include a plurality of component focus areas, such as, for example, a near-focus area 72, a mid-focus area 74, and a far-focus area 76. The far-focus area has the farthest focal point from the lens. The near-focus area has the shortest focal point from the lens. The progressive image lens may also include areas of lower optical performance 78 (shown in FIG. 3). However, such areas are preferably limited.

The image sensor may be tilted based on, and to compensate for, focus shifts due to the progressive lens. The sensor may be tilted to a predetermined angle to compensate for the light rays refracting from the far-focus area of the lens in an downward direction, and/or to compensate for the light rays refracting from the near-focus area of the lens in an upward direction.

The image sensor is preferably a CMOS or a CCD image sensor. In some embodiments, the image sensor is a rectangular image sensor. However, use of a progressive image sensor is also contemplated.

By using a single progressive lens operatively coupled to a single image sensor, the image processing of otherwise disparate ADAS systems is consolidated to one control unit. This allows for unified image processing performance with respect to detection, classification and tracking of the objects. The objects are also detected, classified and tracked with more accurately than when dedicated control units are used for each ADAS function (e.g., lane departure warning, adaptive cruise control, blind spot detection, etc.). System response time, size, cost and failure rates are also thereby reduced. accuracy and response time for the overall system. A unified control system would also reduce size, cost and the failure rate of automotive systems.

FIG. 3 illustrates an exemplary progressive lens. The progressive lens may include a plurality of zones corresponding to the plurality of component focus areas. One of ordinary skill in the art would understand the lens shaping necessary to achieve the described features of the progressive lens.

A distance zone focuses images of objects located within the far-focus area. The distance zone may occupy an upper portion of the progressive lens. The distance zone preferably has a longer focal length than the other zones. In some embodiments, the focal length of the distance zone is 80-300 mm. In some embodiments, the focal distance of the distance zone is 50-200 m. As used herein, the term "focal distance" refers to the distance at which an object is in substantial focus, that is, approximately 90% focused on the progressive image sensor.

A near zone focuses images of objects located within the near-focus area. The near zone may occupy a lower portion of the progressive lens. The near zone preferably has a shorter focal length than the other zones. In some embodiments, the focal length of the near zone is 5-20 mm. In some embodiments, the focal distance of the near zone is 0-10 m.

A middle zone focuses images of objects located within the mid-focus area. The middle zone may occupy a middle portion of the progressive lens. The middle zone preferably has a focal length that is between that of the upper and the lower zones. In some embodiments, the focal length of the middle zone is 20-80 mm. In some embodiments, the focal distance of the middle zone is 10-50 m.

In at least one embodiment, adjacent zones gradually progress into each other such that a boundary between zones is not readily distinguishable. In other words, the respective curvatures of each of the zones may be such that a continuous transition between zones occurs. Accordingly, no matter where an object is located within the progressive focus area, its captured image is in-focus. This is shown, for example, in FIG. 3, which illustrates at least one surface of the progressive image lens having a gradual and smooth change in curvature from top to bottom.

As shown in FIG. 4a, in at least one embodiment, the progressive image sensor includes a sensor surface 21 having a shape that is proportional to the lens curvature. In other words, the distance and curvature of the image sensor surface is configured such that the image from the lens that falls on the sensor does so substantially in-focus across the entire sensor surface. In practice, the sensor surface is preferably further from the lens at respective top portions than at respective bottom portions.

As shown in FIG. 4b, in at least one embodiment, the progressive image sensor may include a plurality of discrete sensor surfaces corresponding to the different zones of the lens. A near sensor surface 22 corresponds to the near zone. A middle sensor surface 24 corresponds to the middle zone. A distance sensor surface 26 corresponds to the distance zone. Each of the sensor surfaces are respectively positioned in terms of angle and distance from the lens such that the image from the lens that falls on each sensor does so substantially in-focus across each sensor surface. It will be understood that while the sensor surfaces are shown as planar, one or all may be of any appropriate shape.

It will be understood that the sensor is configured in terms of shape and orientation with respect to the lens, and vice versa, such that the image from the lens that falls on the sensor does so substantially in-focus. In particular, the lens and sensor are preferably configured such that 75% of the captured image is in-focus. Preferably, however, at least 90% of the captured image is in-focus. One of ordinary skill in the art would understand the sensor shaping and orientation necessary to achieve the described features.

The enablements described in detail above are considered novel over the prior art of record and are considered critical to the operation of at least one aspect of the invention and to the achievement of its objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that the named inventor believes that the claimed subject matter is what is intended to be patented.

The invention claimed is:

1. A control device for a vehicle, comprising:
a control unit configured to adapt a plurality of vehicle systems of the vehicle in response to captured images of an environment external to the vehicle;
a camera configured to capture images of an environment surrounding the vehicle and communicate the captured images to the control unit; and
a progressive lens coupled to the camera so as to focus the captured image over a continuous focus area having a plurality of sub-focus areas, each sub-focus area corresponding to at least one different vehicle system, and each focus area having a different focus range at which objects therein are in-focus,
wherein the control unit is further configured to adapt each of the at least one different vehicle system in response to received images focused via the corresponding sub-focus area, not other sub-focus areas.

2. The control device of claim 1, wherein the control unit is further configured to determine a presence of objects within the environment based on the captured images.

3. The control device of claim 1, wherein the plurality of vehicle systems include one or more of: vehicle steering, vehicle braking, vehicle acceleration, vehicle navigation, and vehicle lighting systems.

4. The control device of claim 1, wherein the progressive lens comprises a progressive focus area.

5. The control device of claim 1, wherein the progressive lens comprises a near-focus area that focuses images of objects located within a first range of 0-10 meters from the progressive lens.

6. The control device of claim 1, wherein the progressive lens comprises a far-focus area that focuses images of objects located within a second range of 50-200 meters from the progressive lens.

7. The control device of claim 1, wherein the progressive lens comprises a mid-focus area that focuses images of objects located within a third range of 10-50 meters from the progressive lens.

8. The control device of claim 1, wherein the progressive lens comprises a near-focus area having a focal length of 5-20 millimeters.

9. The control device of claim 1, wherein the progressive lens comprises a far-focus area having a focal length of 80-300 millimeters.

10. The control device of claim 1, wherein the progressive lens comprises a mid-focus area having a focal length of 20-80 millimeters.

11. The control device of claim 1, wherein the camera includes an image sensor.

12. The control device of claim 11, wherein the image sensor is a single image sensor having a contiguous surface.

13. The control device of claim 12, wherein the image sensor surface and the progressive lens are respectively configured such that the captured images are captured in focus via the image sensor.

14. The control device of claim 11, wherein the image sensor includes a plurality of discontinuous image sensor surfaces.

15. The control device of claim 14, wherein the plurality of discontinuous image sensor surfaces and the progressive lens are respectively configured such that the captured images are captured in focus via the image sensor.

* * * * *